Aug. 22, 1972
J. YOUNG III
3,685,969
STRESS-CORROSION TESTER
Filed May 11, 1970
2 Sheets-Sheet 1
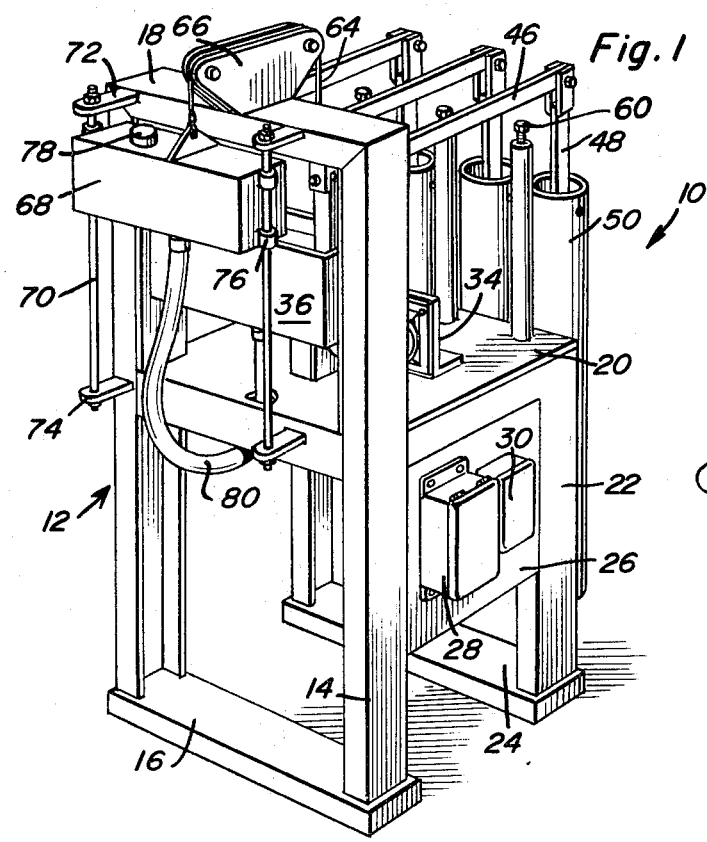
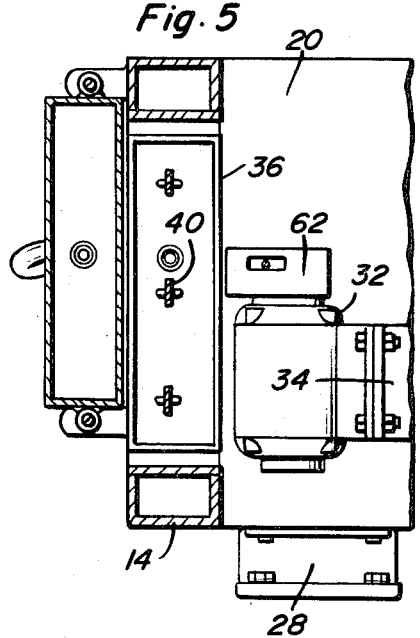
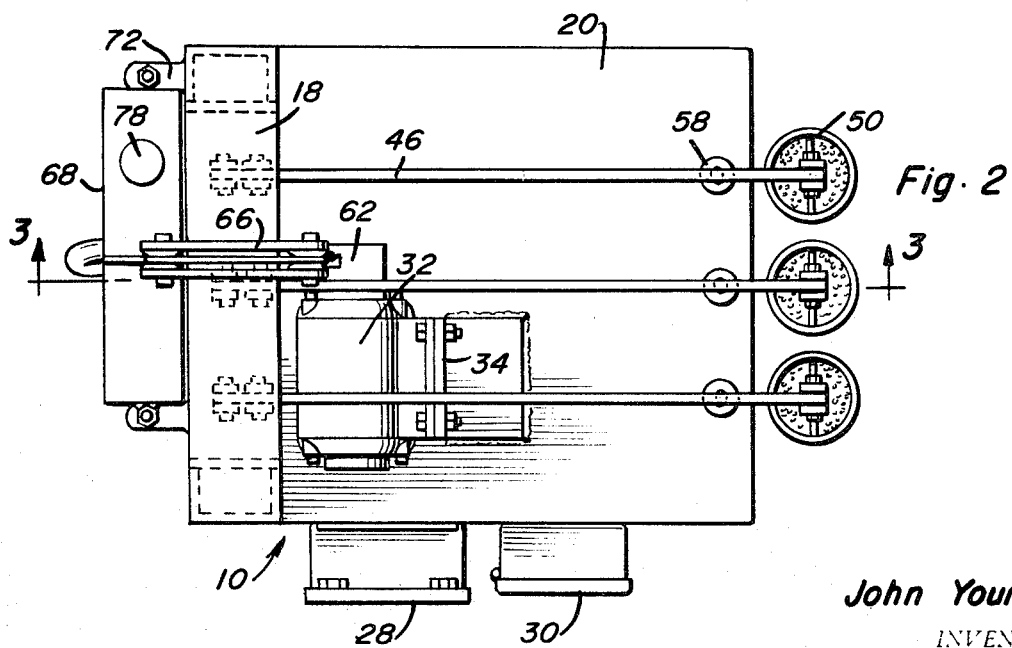
John Young, III
INVENTOR
BY Clarence A. O'Brien
and Harvey B. Jacobson
Attorneys Aug. 22, 1972   J. YOUNG III   3,685,969
STRESS-CORROSION TESTER
Filed May 11, 1970   2 Sheets-Sheet 2

John Young, III
INVENTOR.

BY *Clarence A. O'Brien*
*and Harvey B. Jacobson*
Attorneys

United States Patent Office 3,685,969
Patented Aug. 22, 1972

3,685,969
STRESS-CORROSION TESTER
John Young III, Hurst, Tex., assignor to Murdock Machine & Eng. Co.
Filed May 11, 1970, Ser. No. 36,012
Int. Cl. G01n 3/00, 17/00
U.S. Cl. 23—253 C                     8 Claims

ABSTRACT OF THE DISCLOSURE

A specimen under a continuous stress is intermittently immersed in a corrosive fluid for testing of material strength under corrosive conditions. A storage tank of corrosive fluid is periodically elevated and then lowered by a motor drive relative to a fixed tank within which the test specimen is held under stress in order to transfer the fluid between the tanks by gravity flow.

This invention relates to the testing of the strength of materials and more particularly to such testing under simulated corrosive conditions.

The testing of materials by applying a stress to a test specimen intermittently immersed in a corrosive liquid, has heretofore been proposed in order to determine the strength of the material under corrosive conditions. However, the testing apparatus utilized has involved either movement of the test specimen or the immersion vessel within which the specimen is received. Such arrangements have not been completely satisfactory since it is desirable to maintain both the test specimen and the immersion vessel stationary. It is therefore an important object of the present invention to provide an apparatus whereby corrosive test conditions may be more accurately reproduced in accordance with different exposure conditions, in a relatively simple and economical manner.

In accordance with the present invention, a test specimen is subjected to a continuous stress by applying tension, compression or torsion applied thereto through a lever system from which dead weights are suspended. The test specimen while subjected to this continuous stress, is maintained in static environment within a fixed tank which is periodically filled with a corrosive fluid for an interval of predetermined duration and then drained for another interval during which the specimen is dried. Thus, the intermittent immersing of the test specimen under stress within the corrosive fluid, for a period of predetermined duration, will more accurately reproduce corrosive test conditions. The corrosive fluid is transferred to the tank within which the test specimen is anchored by elevating a storage tank to a position spaced thereabove causing flow of the corrosive fluid through a flexible hose to the fixed tank under gravity flow. When the storage tank is lowered to a position spaced below the fixed tank, the corrosive fluid will be drained from the fixed tank and returned to the storage tank in preparation for another cycle. Elevating and lowering of the storage tank for this purpose is effected through a cable system and a motor controlled by a timer.

These together with other objects and advantages which will become subsequently apparent reside in the details of construction and operation as more fully hereinafter described and claimed, reference being had to the accompanying drawings forming a part hereof, wherein like numerals refers to like parts throughout, and in which:

FIG. 1 is a perspective view showing one embodiment of a testing machine constructed in accordance with the present invention.

FIG. 2 is a top plan view of the machine illustrated in FIG. 1.

FIG. 5 is a partial sectional view taken substantially through a plane indicated by section line 5—5 in FIG. 3.

Figure 3:
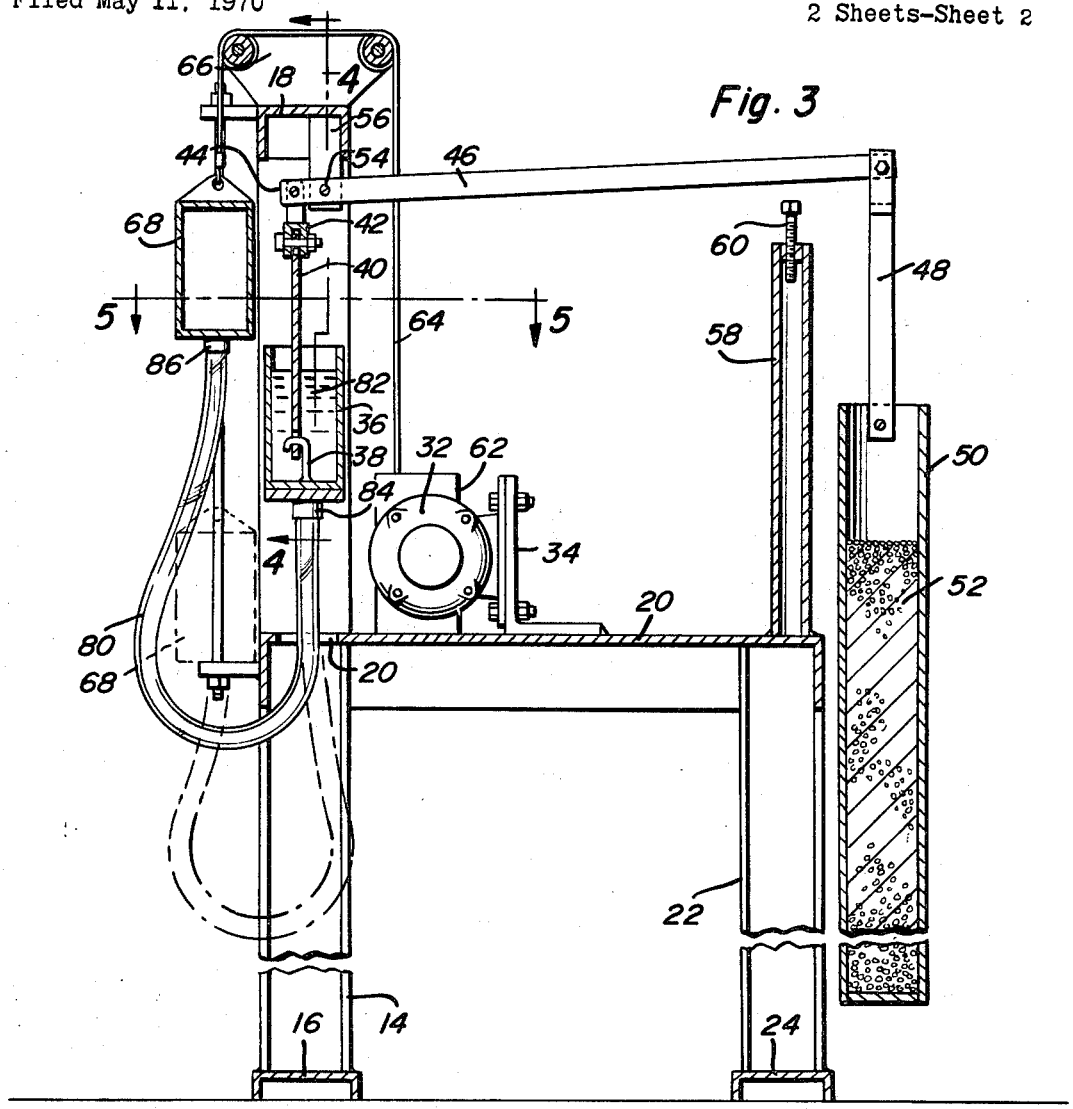
FIG. 3 is a side sectional view taken substantially through a plane indicated by section line 3—3 in FIG. 2.

Referring now to the drawings in detail, and initially to FIG. 1, the material testing machine is generally denoted by reference numeral 10. A frame assembly generally referred to by reference numeral 12 includes a pair of posts 14 interconnected at the bottom by a base 16 and at the top by a top frame member 18. A platform 20 is supported by the posts 14 and by a second pair of posts 22 extending upwardly from a second base member 24. A mounting panel 26 extends between the posts 14 and 22 on one side of the frame assembly. A timer control box 28 and a power supply switch box 30 are mounted on the panel 26. Electrical energy is supplied through the power switch box 30 and timer control box 28 to an electric motor 32. The motor is mounted on the platform 20 by means of an angle bracket 34 as more clearly seen in FIGS. 2, 3 and 5.

Supported between the posts 14 intermediate the platform 20 and the top frame member 18, is a laterally elongated tank or enclosure 36 made of a corrosion resistant material such as stainless steel. As more clearly seen in FIGS. 3 and 4, anchors 38 are disposed within the bottom of the tank 36 in order to anchor the lower ends of test specimens 40 to the frame. In the illustrated embodiment, three anchor elements 38 and test specimens 40 are shown. It will however be appreciated that any number of test specimens may be accommodated by appropriate dimensioning of the machine. The test specimens are connected at their upper ends to coupling assemblies 42 pivotally connected to the ends 44 of a corresponding number of force transmitting levers 46.

Figure 4:
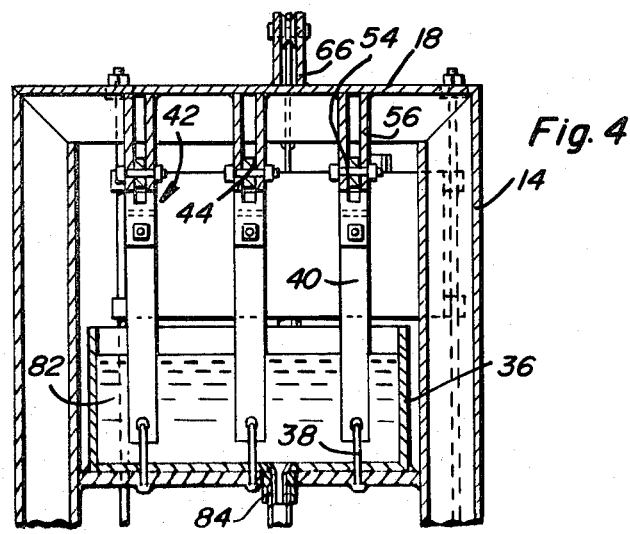
FIG. 4 is a partial sectional view taken substantially through a plane indicated by section line 4—4 in FIG. 3.

As more clearly seen in FIG. 3, each of the levers 46 is pivotally connected to a link 48 at an end opposite the end 44. Each link 48 loads the lever 46 with a dead weight which consists of a tubular container 50 pivotally suspended from the link 48 and containing a predetermined quantity of shot 52. The lever is pivotally mounted on the frame by means of a fulcrum pin 54 extending through pivot brackets 56 depending from the top frame member 18. The fulcrum pin 54 is spaced from the end 44 a predetermined distance in order to provide the desired mechanical advantage necessary to apply the requisite stress to the test specimen 40 when the other end of the lever is loaded by the shot container 50. Thus, each of the test specimens 40 may be placed under a continuous stress of an adjusted amount. In order to limit the downward movement of the lever 46 under load, a tubular rod 58 is secured to the platform 20 aligned beneath the lever 46 adjacent to the end from which the link 48 suspends the shot loaded container 50 in close spaced relation to the post 22. A threaded screw stop 60 is adjustably mounted at the upper end of the rod 58 for engagement by the lever 46.

The motor 32 aforementioned, is drivingly connected to a cable drum assembly 62 from which a cable 64 extends upwardly intermediate the posts 14. A pulley wheel assembly 66 is mounted on the top frame member 18 in alignment with the cable drum assembly 62 so that the cable may be entrained about its idler pulleys and extend downwardly therefrom for connection to the top of a movable storage tank 68 which like the fixed tank 36, is made of a corrosion resistant material such as stainless steel. The tank 68 is guided for vertical movement between an upper position as shown by solid line in FIG. 3 and a lower position as shown by dotted line. Toward this end, vertical guide rods 70 are fixedly mounted in laterally spaced relationship to each other by upper and lower lugs 72 and 74 projecting forwardly from the top frame member 18 and posts 14. The guide rods extend through guide sleeves 76 secured to the lateral sides of the tank 68. The tank 68 is adapted to be charged with a body of corrosive fluid through a filler opening closed by a filler cap 78 as shown in FIGS. 1 and 2.

The tanks 36 and 68 are interconnected by a flexible hose 80 by means of which the body of corrosive fluid 82 is transferred between the tanks. Outlet fittings 84 and 86 are therefore mounted on the bottoms of the tanks 36 and 68 to which the opposite ends of the transfer hose 80 are connected, the hose extending through an opening in the platform 20 for this purpose.

It will be apparent from the foregoing description, that upon energization of the motor 32, the movable tank 68 may be elevated or lowered through the cable drum assembly 62 and cable 64 between its upper and lower positions. In the upper position of the movable tank 68, as shown in FIG. 3, the body of corrosive fluid will be transferred under gravity flow through the hose 80 to the fixed tank 36. Thus, for a predetermined interval of time when the movable tank 68 is in its upper position, the test specimens 40 under continuous stress, will be immersed in the corrosive fluid. When the movable tank 68 is lowered to its lower position as shown by dotted line in FIG. 3, the corrosive fluid 82 will be drained from the fixed tank 36 into the movable tank 68 through the transfer hose 80. Thus, by means of the timer control box 28, intermittently energizing and de-energizing the motor 32, the test specimens 40 while being continuously stressed, will be periodically immersed in the corrosive fluid and then dried in air. By means of the timer control box, the duration of the immersion interval and drying interval may be varied during each cycle. For example, in the case of aluminum test specimens, the specimens may be held in the corrosive solution 82 for 10 minutes, and dried for 50 minutes during each cycle, the cycles continuing for 30 days. Depending upon the material being tested and the conditions to be reproduced, the cycle phases may be varied as well as the total time for the testing procedure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for testing the strength of a specimen under corrosive conditions comprising a frame, means mounted on the frame for applying a continuous stress to the specimen, a body of corrosive fluid, means rendered operative while said specimen is under said continuous stress for intermittently immersing said specimen within the body of corrosive fluid, said intermittent immersing means including an enclosure fixedly mounted on the frame within which the specimen is anchored, a container movably mounted on the frame, drive means operatively connected to the container for displacement thereof and conduit means for transferring said body of corrosive fluid between the enclosure and the container in response to said displacement of the container.

2. The combination of claim 1 wherein said container is displaced between positions vertically spaced above and below the enclosure.

3. The combination of claim 2 wherein said drive means includes a motor, cable means connected to the container for elevating and lowering the same in response to energization of the motor, and timer-controlled means for periodically energizing the motor at spaced intervals.

4. The combination of claim 3 wherein said means for applying stress includes a lever having opposite ends, means pivotally mounting the lever between said ends, coupling means connecting one end of the lever to the specimen in vertically spaced relation above the enclosure and loading means connected to the other end of the lever.

5. The combination of claim 1 wherein said drive means includes a motor, cable means connected to the container for elevating and lowering the same in response to energization of the motor, and timer-controlled means for periodically energizing the motor at spaced intervals.

6. The combination of claim 1 wherein said means for applying stress includes a lever having opposite ends, means pivotally mounting the lever between said ends, coupling means connecting one end of the lever to the specimen in vertically spaced relation above the enclosure and loading means connected to the other end of the lever.

7. Apparatus for testing the strength of a specimen under corrosive conditions comprising a fixed enclosure within which the specimen is anchored, a container storing a body of corrosive fluid, means for applying a continuous stress to the specimen within the enclosure, drive means for imparting movement to the container relative to the enclosure and conduit means for transferring the body of fluid between the container and the enclosure in response to said relative movement.

8. The combination of claim 7 wherein said drive means includes a motor, cable means connected to the container for elevating and lowering the same in response to energization of the motor, and timer-controlled means for periodically energizing the motor at spaced intervals.

References Cited

UNITED STATES PATENTS 2,484,279   10/1949   Folz _____ 73—86

OTHER REFERENCES

Mears et al., Proceedings ASTM, vol. 44, pp. 639–642 (1944). Sci. Library (TA401.A5).

Uhlig, The Corrosion Handbook, pp. 965–968, 1009–1011 (1948). A.U. 171 (TA462.U4).

Champion, Corrosion Testing Procedures, pp. 73–76, 82, 132–136, 2nd ed. (1965). Sci. Library (TA462C44).

JOSEPH SCOVRONEK, Assistant Examiner

U.S. Cl. X.R.

73—88